United States Patent [19]
Deierlein

[11] Patent Number: 5,995,393
[45] Date of Patent: Nov. 30, 1999

[54] LATCHING SHUTDOWN AND DELAYED RESTART OF DC POWER SUPPLY IN BROADBAND NETWORK

[75] Inventor: Peter D. Deierlein, Chittenango, N.Y.

[73] Assignee: Philips Electronics N.A. Corporation, New York, N.Y.

[21] Appl. No.: 09/127,002

[22] Filed: Jul. 31, 1998

[51] Int. Cl.$^6$ .............. H02M 1/12; H02M 7/10; H02M 5/42; H02H 7/125

[52] U.S. Cl. .............. 363/49; 363/53; 363/89; 323/901; 323/285

[58] Field of Search .............. 363/49, 50, 52, 363/53, 80, 81, 89; 323/285, 284, 351, 901, 908

[56] References Cited

U.S. PATENT DOCUMENTS

| | | | |
|---|---|---|---|
| 3,798,531 | 3/1974 | Allington | 363/89 |
| 4,195,333 | 3/1980 | Hedel | 363/21 |
| 4,621,313 | 11/1986 | Kiteley | 363/49 |
| 4,717,994 | 1/1988 | Diaz et al. | 363/56 |
| 4,791,544 | 12/1988 | Gautherin et al. | 363/49 |
| 4,937,722 | 6/1990 | Deierlein | 323/290 |
| 5,612,609 | 3/1997 | Choi | 323/210 |

*Primary Examiner*—Peter S. Wong
*Assistant Examiner*—Bao Q. Vu
*Attorney, Agent, or Firm*—Michael E. Belk

[57] ABSTRACT

In a complex power distribution network (e.g. CATV), a switching mode power supply at a node, automatically recovers from low input voltage conditions. When the input voltage to a switching power supply decreases to a critical level, the output voltage is no longer regulated and input current increases, and then the network becomes unstable. The network can enter a quasi-stable high current condition in which the output voltage remains unstable. In one specific embodiment, an automatic shut down circuit senses the unstable condition (or a voltage or current indicating the potential for instability) and latches the power supply into a shut down state. After a predetermined pause (that may depend on the input voltage), the power supply automatically restarts. Upon restarting, if the power supply is still unstable or potentially unstable, then the shut down circuit shuts the power supply down again and so forth. In another specific embodiment, the controller regulates the output voltage of the power supply when input voltage is sufficient, but when input voltage decreases then a controller of the power supply operates in an approximately constant current mode so that the distribution network maintains stability.

8 Claims, 6 Drawing Sheets

LATCHING SHUTDOWN AND DELAYED RESTART OF DC POWER SUPPLY IN BROADBAND NETWORK

FIELD OF THE INVENTION

The inventions relate to complex alternating-current (AC) power distribution systems in which the electrical loads are primarily direct-current (DC), regulated-voltage power supplies provided with input power from the distribution system. More specifically the invention relates to such a DC power supply which limits the current provided when the distribution system becomes unstable due to low input voltage.

BACKGROUND

In modern community antenna television (CATV) distribution networks (also known as broadband networks), there have been recent shifts to multi-redundant centralized powering and to the extension of networks by using fiber optic transmission cables. In order to provide these expanding networks and power hungry equipment with AC power from a single source, the AC voltage in these systems is being increased from the 60 volts to 90 volts. The resulting networks tend to have higher voltage drops along the distribution tree than previous networks, and have been plagued by unstable conditions wherein DC power supplies begin drawing increased current and overloading the AC power delivery capabilities of the network.

In an ideal system consisting of a power source and a load, maximum power transfer occurs when the impedance of the load matches the impedance of the power supply. If the load resistance increases then current through the system will decrease and less power will be transferred. If the load resistance decreases then the voltage across the load will decrease and less power will be transferred.

In a CATV system, long conductor distances have significant series resistance so that remote portions of these systems tend to have voltages far below the voltage at the AC power source. In addition AC voltage in the system may vary dynamically due to momentary power interruptions, sags, system maintenance, adding new users, activation of various equipment in the system, temporary overloads, or "sheath currents" caused by imbalances in the power distribution system.

In CATV, at nodes, signal amplifiers, and customer interface units (CIUs), AC power is converted to DC power by a power supply, and the DC power is used to operate various electronic equipment. Switched-mode power supplies (SMPSs) are used in these applications because they are able to maintain high conversion efficiency over a wide range of input voltage. Unfortunately, this constant power characteristic provokes instability in the AC power distribution network because the input impedance of the DC power supplies is dynamically negative. That is, a decrease in the supply voltage causes an increase in the current demanded by the power supplies which causes increased voltage drop through the distribution system and results in a further decrease in the voltage at the input of the DC power supply.

In modern DC power supplies, as the AC input voltage drops towards a minimum level, the current demanded by the power supply increases, and then the DC output becomes unregulated when the AC input voltage dips below the DC power supply's minimum level. At that time, the current demanded by the DC power supply stops increasing and the network enters a quasi-stable state in the overloaded condition. The increased current further reduces the input voltage throughout the branch of the network. Thus, as a DC power supply in one branch of the power distribution network becomes unregulated, then other DC power supplies in the branch tend to also become unregulated resulting in cascade failures. A large number of CATV cable customers are subjected to service degradation or interruption. In addition, the recovery voltage at which the network regains its stability is significantly higher than the voltage at which it originally became unstable, so that it is difficult to regain stability. Currently, the typical response to instability is to shut down the entire system or at least a portion of the system that can be remotely shut down, and then power distribution is reinitiated in the shut down portion.

Those skilled in the art are directed to the following citations. "Powering Stability in 90 Volt Networks" by Peter Deierlein in 1996 NCTA Technical Papers describes the power distribution system instability problem and suggests that "a latching shutdown function (with delayed restart) is added to the power supplies". European Patent Application 0 582814 A2, to Newton suggests "A regulator circuit that allows recovery in a controlled manner in the shortest possible time from occasional power line disturbances".

Those skilled in the art are referred to U.S. Pat. No. 4,937,722 to Deierlein.

The above citations are hereby incorporated herein in whole by reference.

SUMMARY OF THE INVENTION

In the invention, circuitry of the DC power supplies in the CATV system sense any reduction of the input voltage below a predetermined level and then shut down the power supply, or fold back the power supply into current limited operation so that the power distribution system remains stable in low voltage operation. In the case of a power supply with automatic shut down, after shut down the power supply is allowed to immediately initiate its normal delayed start sequence, but upon restart if the voltage is still too low then the power supply is again shut down. Preferably, one or more diodes and a voltage divider provide a rectified input voltage sense signal that is proportional to the AC input voltage of the DC power supply and if the voltage of the input voltage sense signal is below a reference voltage then a latching comparator shuts the power supply down. With the invention, when one DC power supply in a branch shuts down due to low voltage, then current in the power distribution system deceases resulting in increased input voltage to other DC power supplies. Thus, the power distribution system tends to remain stable. Operation according to the invention, results in only a minimal interruption of services to the CATV customers.

DETAILED DESCRIPTION OF PREFERRED EMBODIMENTS AND THE BEST MODE

Figure 1:
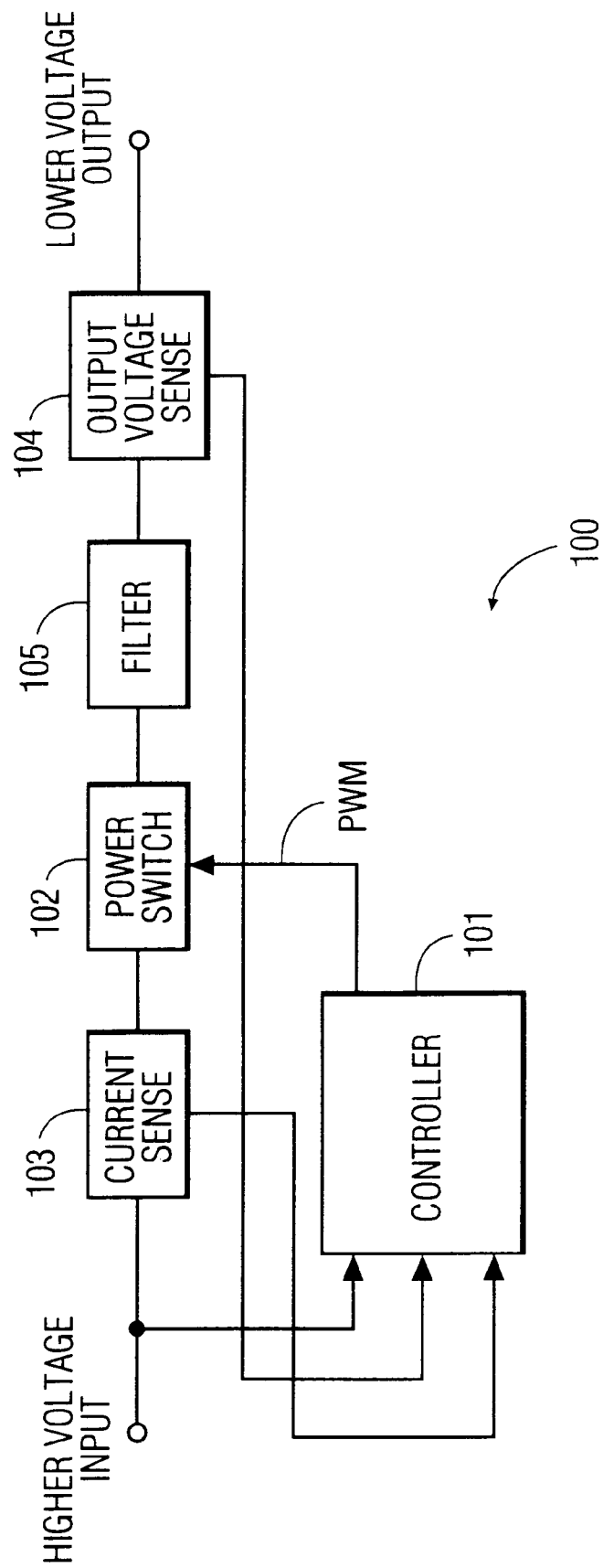
FIG. 1 is a schematic of a DC power supply which does not include the invention.

FIG. 1, illustrates a power supply 100 which does not incorporate the invention. Controller 101 controls the operation of power switch 102 to convert relatively higher voltage input power to lower voltage output power depending on inputs from current sensor 103 and output voltage sensor 104. Depending on the signal from the current sensor, the controller limits start up current so that the power supply and electronic equipment connected to the power supply are not damaged. The current sensor may be provided on either side of the power switch. Typically, the power supply operates in a switching mode to minimize losses in the power switch. In which case, the power switch operates as a high frequency on/off switch depending on a pulse width modulated (PWM) signal from the controller. Switching mode power supplies generally require a filter such as filter 105, in order to provide a continuous level of voltage at the output.

Figure 2:
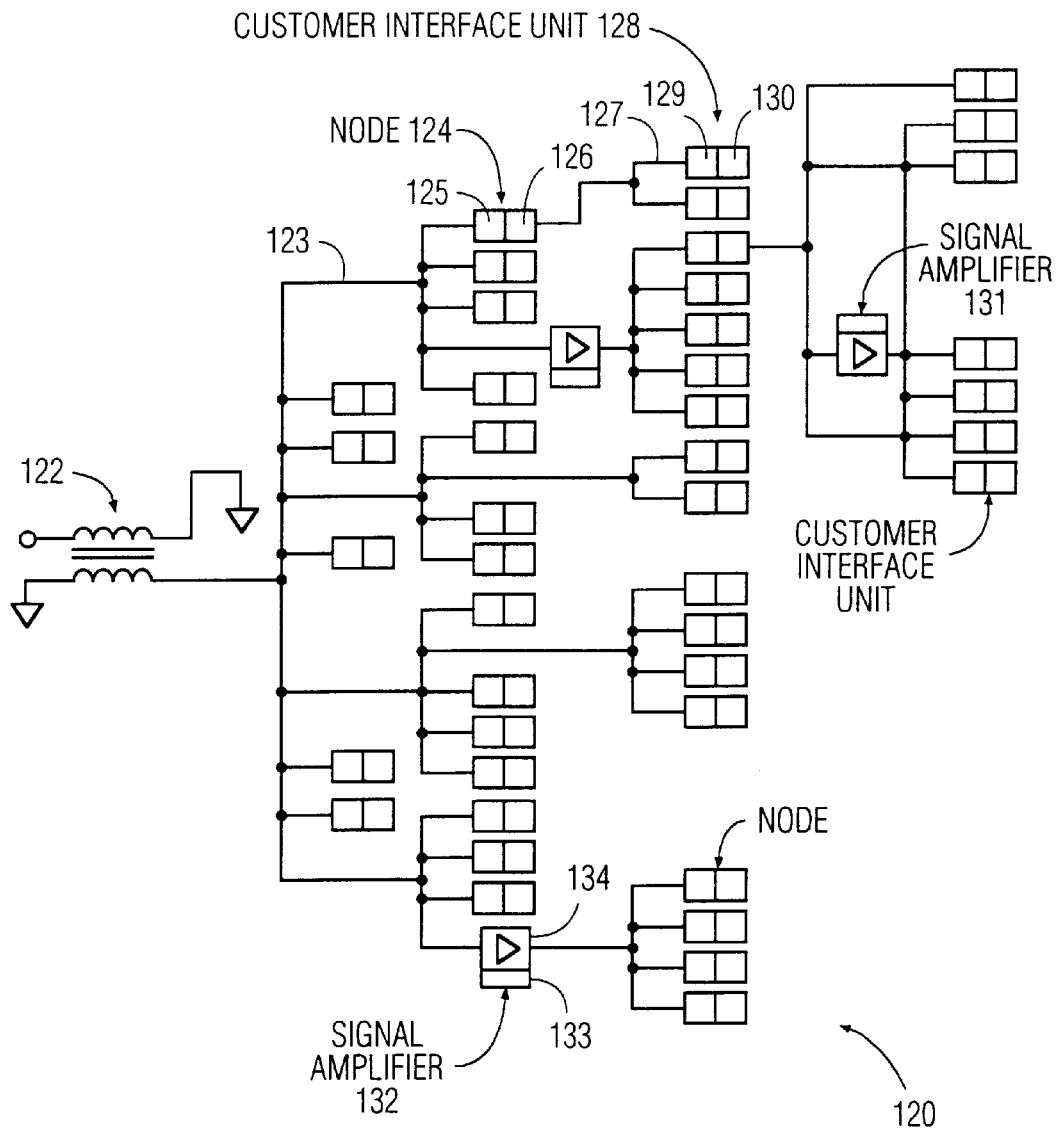
FIG. 2 is a schematic of a CATV AC power distribution system.

FIG. 2 illustrates AC power distribution system 120 of a CATV-type cable television distribution system. The typical components of this system each include a DC power supply according to the invention herein. In this system, one or more of the DC power supplies incorporate a latching shut down for stopping the operation of the DC power supply when the input AC voltage level drops below a predetermined minimum. The shutdown is followed by initiation of the normal delayed start-up so as to provide a stable power distribution system. Alternately, the DC power supplies may include means to limit the current consumed by the power supply when the output voltage becomes unregulated.

At the head end of the CATV system, a central power source 122 includes a step down transformer to provide AC power to the system at 90 volts. The AC power is distributed through tree 123 of conductors to nodes such as node 124. The nodes include DC power supply 125 and electronic equipment 126.

In modern cable systems, optical cables (not shown) extend from the head end to the nodes where the optical information signal is converted to an electrical information signal. The electronic equipment of the nodes include an optical to electrical transducer and an electrical signal amplifier to provide an electrical signal to coaxial conductor tree 127 that distributes the signal and that also further distributes the AC power. The coaxial tree extends to customer interface units (CIUs) 128 that also include DC power supply 129 and electronic equipment 130. Only a few coaxial trees are shown in order to simplify the illustration, but typically such a tree extends from every node to multiple CIUs. Alternately, in systems in which optical cables extend directly to the CIUs, nodes 124 would be replaced by CIUs 128 and the coaxial trees eliminated.

Signal amplifiers 131 and 132 are also commonly provided in the CATV network to boost the signal strength in the signal distribution trees in order to extend the region that the CATV system can serve. Again, the amplifiers include DC power supply 133 and electronic equipment 134 for signal amplification.

Figure 3:
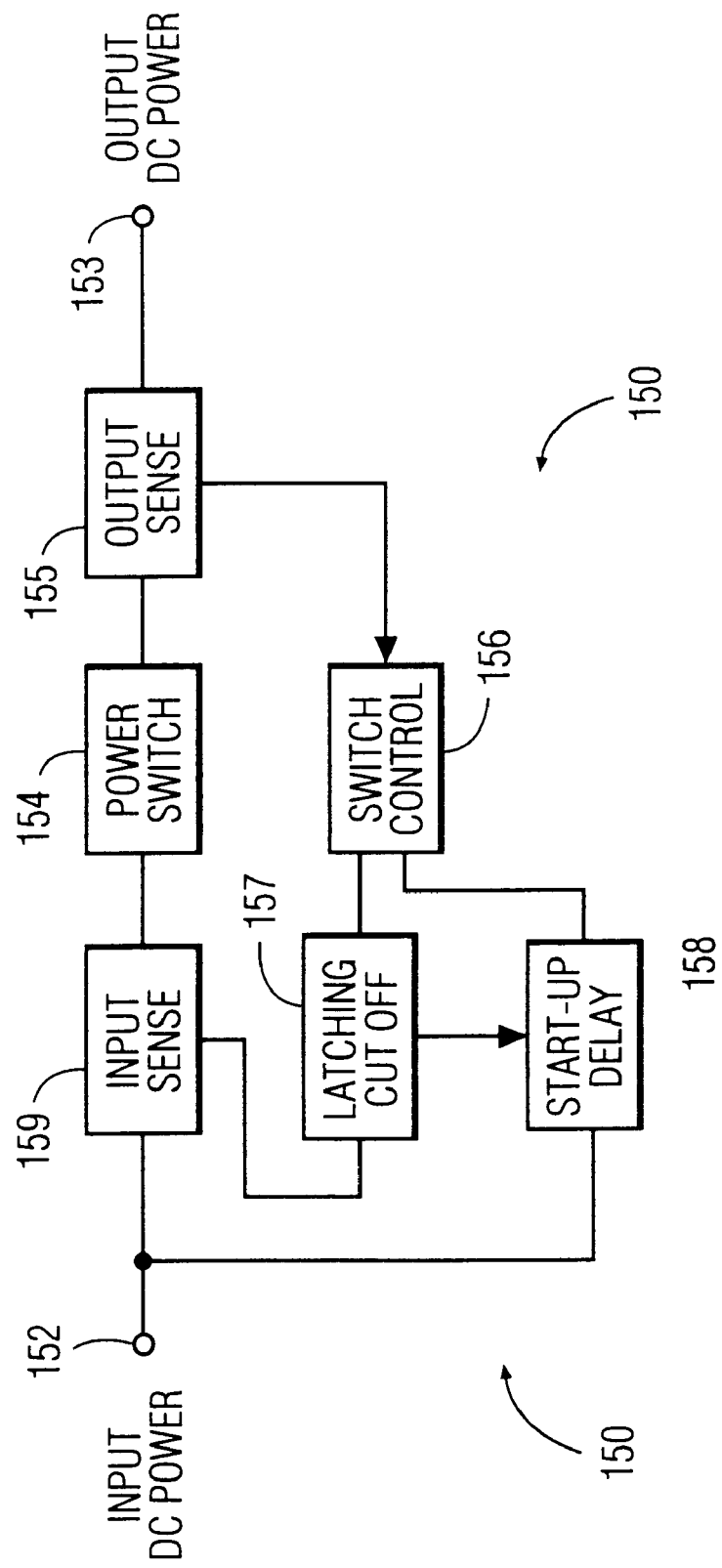
FIG. 3 is a schematic of a specific embodiment of the DC power supply of the invention.

FIG. 3 shows a specific embodiment of the power supply 150 of the invention. Power switch 154 is regulated by switch control 156 so as to control the flow of current from the higher voltage input DC power to the lower voltage output DC power depending on: a property of the output power (current, voltage, power, etc.), latching cut off 157, and startup delay circuit 158. For a current supply, the output sense would sense the current through the power supply, and for a voltage supply, the output sense would sense the voltage at the output. The operation of the latching cut off depends on input sense 159. The input sense could activate the cut off when input voltage decreases below a predetermined minimum voltage so that operation became unstable or when the current becomes higher than a predetermined maximum indicating unstable operation, or some combination of these criteria. When the cut off is activated it causes the reset of the startup delay so that the power supply can start up after a predetermined delay and check for changed operating conditions. Normally, the input sense and the output sense would not both be current sensors.

Figure 4:
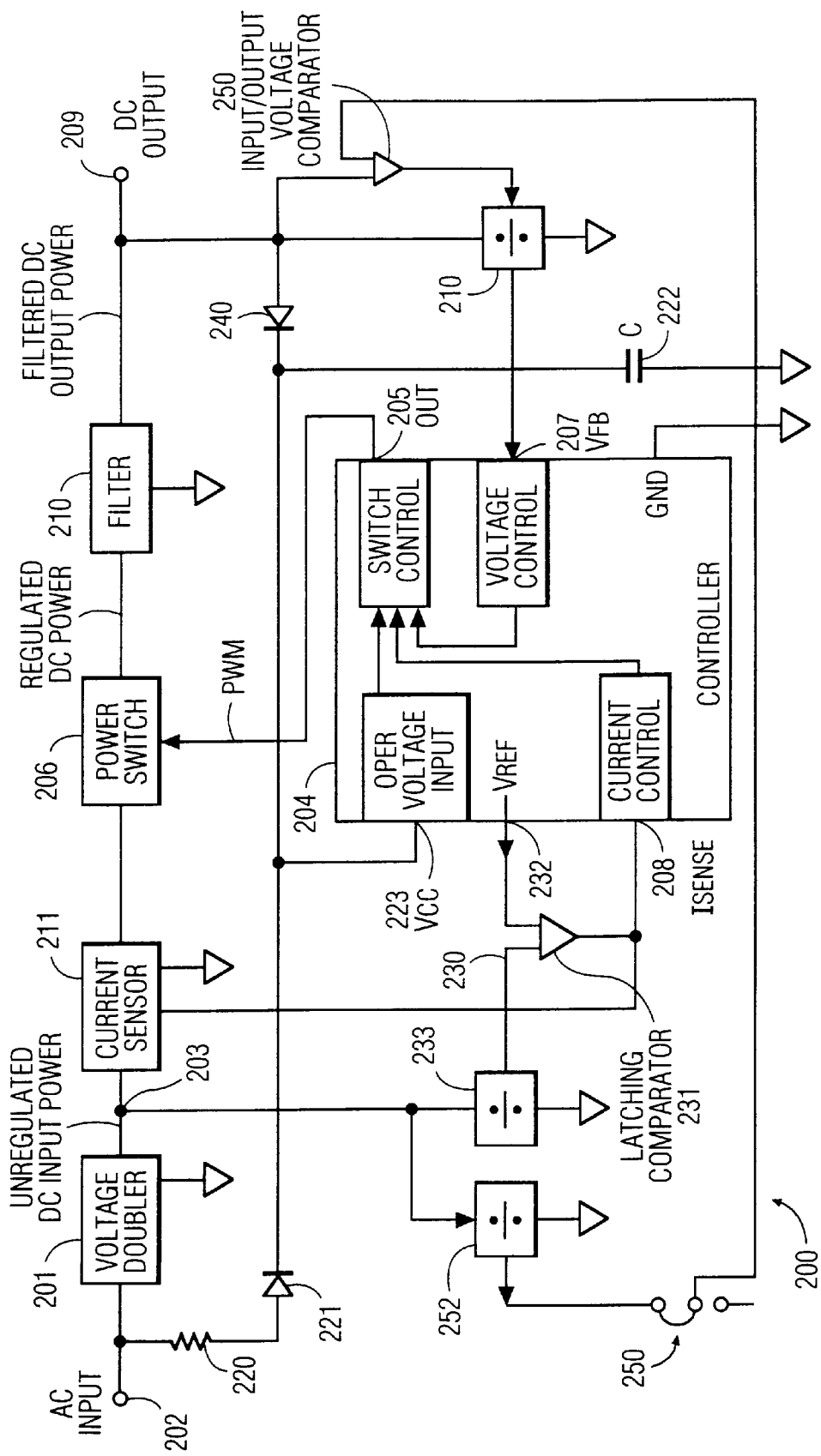
FIG. 4 is a schematic of a more detailed embodiment of the invention.

FIG. 4 illustrates another example embodiment of DC power supply 200 of the invention. This switched-mode power supply is somewhat similar to a buck converter. Voltage doubler 201 converts AC input power at 202 to unregulated DC input power at 203. Integrated circuit controller 204 provides a pulse width modulated signal at 205 to control the operation of power switch 206. The controller may be a Unitrode UC1842J, for example. The power switch may be, for example, a MOSFET. The operation of the controller depends on an output voltage signal provided at input 207 of the controller and a current signal at input 208 of the controller. The switch duty cycle is modulated to maintain a constant predetermined output voltage as long as the current level of the current signal is below a predetermined maximum. The regulated output voltage 209 may be set to any voltage level by appropriate selection of the series resistors (not shown) of voltage divider 210. The current for the current signal is provided by current sensor 211 which may be provided on either side of the power switch. The current sensor may be implemented as a transformer which produces a mirror current that is proportional to the current through the power switch.

At start-up, when voltage is first applied at the AC input, a start-up delay is provided by the resistance of resistor 220 which limits the current flowing through diode 221 into capacitor 222 which prevents the operating voltage at 223 from reaching operating levels to operate the controller until the capacitor is charged. The time period will depend on the input voltage (45 to 90 volts), the resistance of resistor 220, and the capacitance of capacitor 222.

A latching comparator 231 stops the operation of the controller and turns the power switch off when the input level drops below a predetermined value. When the value of the input voltage signal at input 230 of latching comparator 231 drops below the level of the reference voltage provided at 232 by controller 204, then the comparator transmits an over current signal to the current sensor input 208 which results in the controller turning the power switch off. The latching comparator continues to transmit the over current signal until the reference voltage drops to zero which does not occur until the controller stops operating. The comparator may be a silicon controlled rectifier (SCR) or a unijunction transistor operated as an SCR. The cut-off voltage can be set to any value by selection of the series resistors (not shown) of voltage divider 233. Preferably, the shut down voltage should be sufficiently above the voltage at which the power supply could become unregulated. Alternatively, comparator 231 could transmit the over current signal to the voltage control pin at 207 to turn off power switch 206 which stops the operation of controller 204.

In the start-up circuit, the current supplied through resistor 220 is sufficient to charge capacitor 222 slowly enough to delay the start of operation of the controller until after a predetermined minimum delay, as described above, but the current through resistor 220 is insufficient to continue the operation of the controller. The power required to operate the controller during normal operation, is provided from the output power through diode 240. When the over current signal is provided by latching comparator 231 (e.g. due to low input voltage) then capacitor 222 is discharged until the controller stops operating. Thus, the restarting time may be nearly as long as the initial start up time when AC power is initially applied to the power supply. In this embodiment the same mechanism that delays the initial start up also delays the restarting after a shut down due to low input voltage.

When jumper 250 is set, then the operation of the circuit is modified so that the input current is limited to prevent system instability and the power supply does not shut down unless the system becomes very unstable. Comparator 251 compares the output voltage with a DC input voltage signal that is proportional to the AC input voltage and that is provided by voltage divider 252. When the input voltage signal drops sufficiently with respect to the output voltage then the voltage division of voltage divider 210 is modified so that the input current becomes approximately constant. The output voltage becomes unregulated but the power supply does not shut down so that equipment in the nodes, amplifiers, and CIUs that are affected but are capable of operating with reduced unregulated DC voltage, could continue to operate. The input current does not increase so the AC distribution system remains stable.

Figure 5:
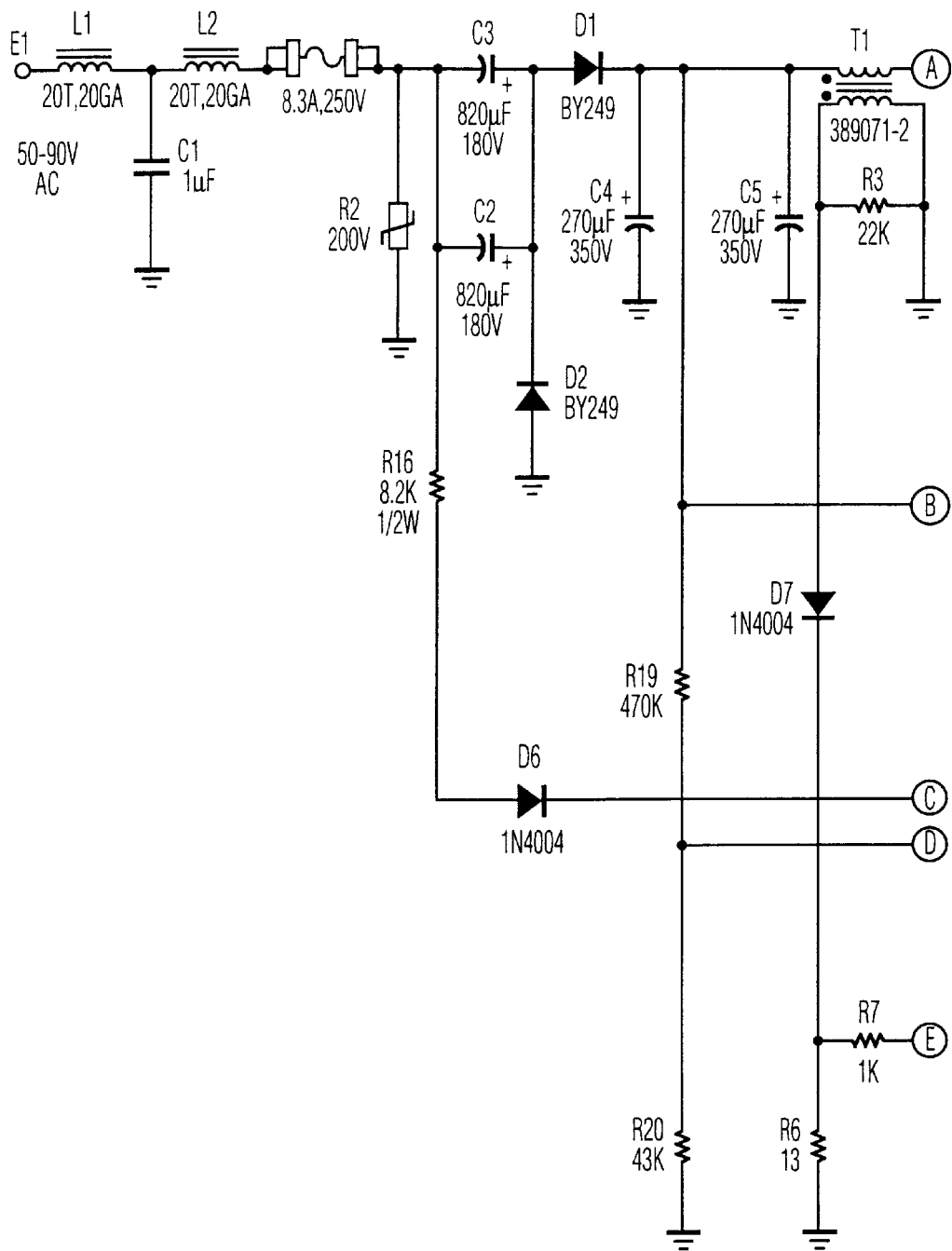
FIGS. 5 and 6 illustrate a detailed specific embodiment.
Figure 6:
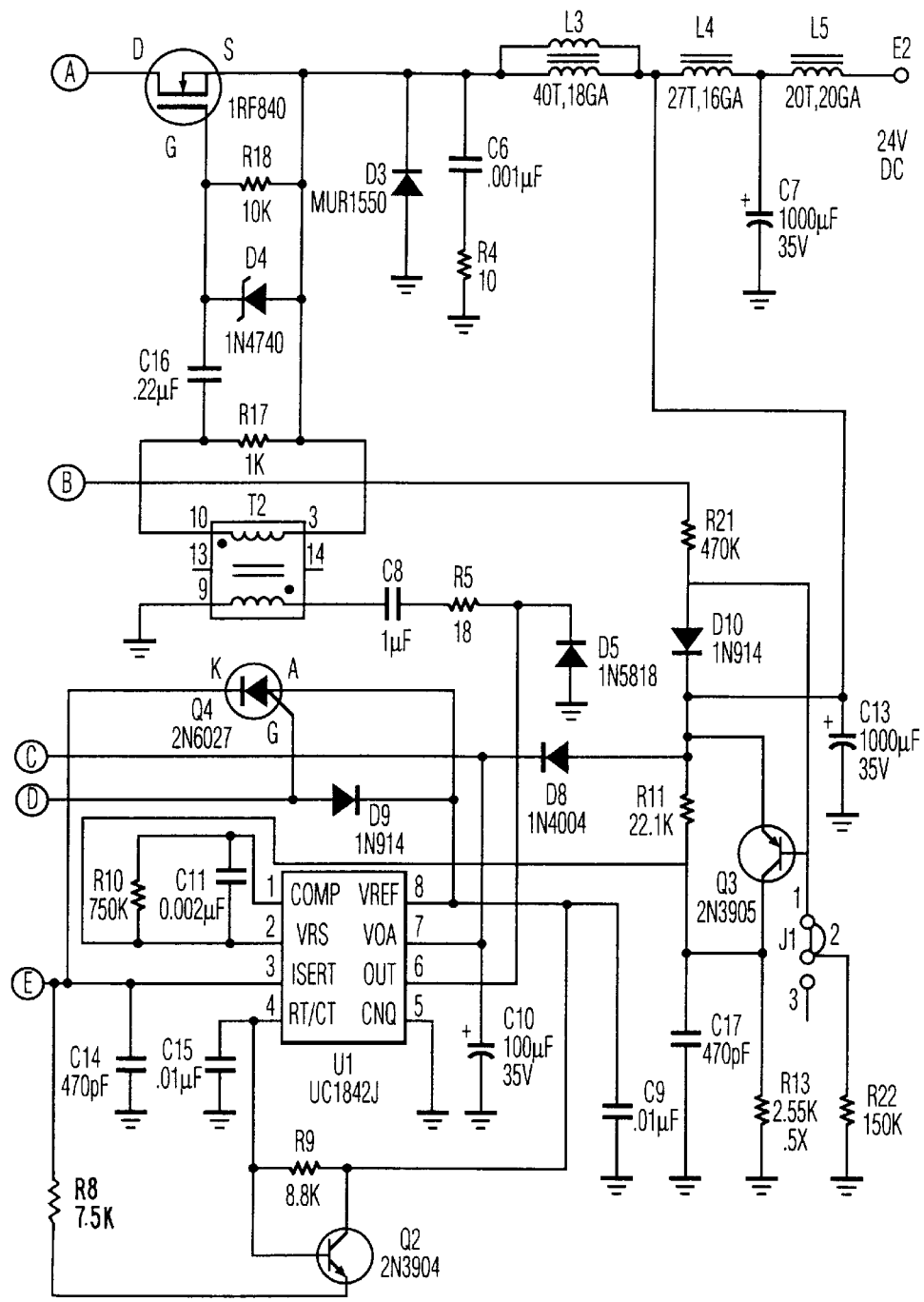

FIGS. 5 and 6 schematically illustrate a specific embodiment of the invention similar to the embodiment of FIG. 4. In view of the description of FIG. 4 above, those skilled in the art will not require a detailed description of FIGS. 5 and 6.

The invention has been described with reference to specific embodiments including the best mode for carrying out the invention, and with sufficient detail that anyone skilled in the art can make and use the invention. Those skilled in the art may modify these embodiments or provide other embodiments within the spirit of the invention, and thus, the description does not limit the present invention to the disclosed embodiments. The invention is limited only by the following appended claims.

I claim:

1. A complex power distribution network, comprising:
   a central source of alternating-current (AC) electrical power;
   a plurality of nodes containing electronic equipment that operates on regulated-voltage direct-current (DC) electrical power;
   an electrically conductive tree connected to the central power source and having branches and sub-branches extending to the nodes;
   a switched-mode power supply which converts AC input power to DC output power and including:
      an input connection for providing AC input power to the power supply;
      an output connection for supplying voltage-regulated DC output power;
      a power switch for regulating the output power;
      a first voltage divider for providing an output power signal that is proportional to the DC output power voltage;
      a switch controller for controlling the power switch depending on the output power signal so as to maintain approximately constant output voltage;
      means for providing a reference voltage that is independent of the level of the voltage at the AC input power;
      a second voltage divider for providing an input power signal that is proportional to the voltage of the AC input power;
      latching comparator means for comparing the input voltage signal with the reference voltage and for providing a latched shut down signal depending on the comparison so that once initiated the signal continues until the power supply is shut down;
      means for shutting down the power supply depending on the shut down signal; and
      means for delaying start-up of the power supply upon initially providing AC power to the input connection and for delaying re-starting the power supply after shutting down depending on the sensing signal.

2. The network of claim 1 in which the latching comparator means includes a silicon controlled rectifier.

3. The network of claim 1 in which the latching comparator means includes a unijunction transistor operating as a silicon controlled rectifier.

4. The network of claim 1 in which:
   the power supply includes a current sensor to provide a current signal which is proportional to the current flowing through the power supply;
   the switch controller controls the power switch also depending on the current signal and the shut down signal.

5. The network of claim 4 in which the switch controller is an integrated circuit and both the current signal and the shut down signal are connected to the same current sense pin of an integrated circuit that includes the switch controller.

6. A switched-mode power supply for providing regulated direct-current (DC) power from input power, comprising:
   an input connection for providing input power to the power supply;
   an output connection for supplying the stable DC power;
   a power switch for voltage regulating the output power;
   means for providing an output power signal depending on one or more properties of the DC output power;
   a switch control for controlling the power switch depending on the output power signal;
   means for providing a reference voltage that is independent of the level of the voltage at the power supply power input;
   means for providing an input power signal depending on one or more properties of the input power;
   latching comparator means for comparing the input power signal with the reference voltage and for providing a latched shut down signal depending on the comparison so that once initiated the shut down signal continues until the power supply is shut down and then the signal de-latches;
   means for shutting down the power supply depending on the shut down signal; and
   means for delaying start-up of the power supply upon initially providing input power and for delaying re-starting the power supply after shutting down due to the shut down signal.

7. A switched-mode power supply for providing direct-current (DC) power from input power, comprising:
   an input connection for providing input power to the power supply;
   an output connection for supplying regulated DC power;
   a power switch for regulating the connection between the input power and the output power;
   means for detecting the current through the power supply and providing a current signal depending on the detection;
   a control circuit for providing a voltage signal which is proportional to the output voltage when the AC input voltage is significantly above a level at which the DC output voltage may potentially become unregulated, and which is a function of both the AC input voltage and the DC output voltage when the AC input voltage is below a level at which the DC output voltage becomes unregulated; and switch control means for controlling the power switch depending on the voltage signal to maintain a constant DC output voltage when the output is voltage regulated and to limit the current to a predetermined maximum current when the output voltage is unregulated.

8. The network of claim 1 in which:

the central source of AC power is a single active connection to a higher voltage AC power source through step down apparatus;

the switch controller and the reference voltage providing means are portions of an integrated circuit and the output power signal is connected to an input of the integrated circuit;

the shut down signal is connected to the same input of the integrated circuit as the output power signal;

the voltage of the AC power provided to the conductive tree at the central source is approximately 90 volts;

the voltage of the AC power in the conductive tree at one or more of the nodes or customer interface units of the network during operation transients is less than half the voltage at the central source;

an optical cable is associated with the conductive tree between the central source and the nodes and carries an optical information signal; and the electronic equipment in the nodes includes optical to electrical signal transducers to provide an electrical information signal; and the conductive tree includes coaxial cable trees extending from the nodes and carrying the electrical information signal and AC power from the nodes to subscriber interface units that also include switched-mode power supplies;

the network further comprises signal amplifiers for amplifying an electrical information signal carried in coaxial cables; the signal amplifiers including switched-mode power supplies for operating signal amplification equipment;

the DC output from the power supply is regulated at 24 volts;

the delaying means includes a capacitor that is discharged when the power supply is shut down due to low input voltage and which is charged when input voltage is supplied and the power supply is not operating, the charging is from the input voltage through a resistor to provide a predetermined delay period before the start of operation and which is kept charged during power supply operation by a connection with the output voltage through a diode; and the power supply includes an output filter to provide approximately continuous voltage DC output.

* * * * *